(12) United States Patent
Iellimo et al.

(10) Patent No.: US 10,285,514 B2
(45) Date of Patent: May 14, 2019

(54) RACK SHELF BARRIER

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 15/783,020

(22) Filed: Oct. 13, 2017

(65) Prior Publication Data

US 2019/0110612 A1 Apr. 18, 2019

(51) Int. Cl.
*A47F 5/00* (2006.01)
*B65G 1/02* (2006.01)

(52) U.S. Cl.
CPC ............. *A47F 5/0068* (2013.01); *B65G 1/02* (2013.01)

(58) Field of Classification Search
CPC ........... A47F 5/0068; B65G 1/02; B65G 1/14; A47B 96/06
See application file for complete search history.

(56) References Cited

U.S. PATENT DOCUMENTS

| | | | | |
|---|---|---|---|---|
| 1,093,201 A * | 4/1914 | Owen | ................ | B61D 17/12 52/42 |
| 2,080,261 A * | 5/1937 | Funk | ................ | B60R 7/08 248/224.8 |
| 2,721,362 A * | 10/1955 | McCoy | ................ | H02G 7/20 174/43 |
| 3,462,108 A * | 8/1969 | Buyken | ................ | A47B 96/061 248/205.1 |
| 3,547,398 A * | 12/1970 | Furr | ................ | E04G 17/0721 249/219.2 |
| 3,729,159 A * | 4/1973 | Foster | ................ | E04G 17/02 248/205.1 |
| 3,802,574 A * | 4/1974 | Weider | ................ | A47B 47/027 108/187 |
| 4,210,301 A * | 7/1980 | Weiss | ................ | E04D 13/0725 248/48.2 |
| 6,173,846 B1 * | 1/2001 | Anderson | ............ | A47B 47/027 211/183 |
| 7,658,356 B1 * | 2/2010 | Nehls | ................ | F24J 2/5205 248/237 |
| 7,805,904 B2 * | 10/2010 | Clark | ................ | A47F 5/0892 248/317 |
| 7,854,421 B2 * | 12/2010 | Florent | ................ | F16L 3/24 248/300 |

(Continued)

*Primary Examiner* — Ko H Chan
(74) *Attorney, Agent, or Firm* — Dilworth & Barrese, LLP (57) ABSTRACT

An improved shelf barrier for helping prevent items, including pallets of goods from unintentionally sliding off the shelves of pallet racks. The stop member can include at least one, preferably two or more grooves formed therein as strengthening features. The grooves can be concave grooves on one surface of the stop and can also be corresponding convex ribs on the opposite surface of the stop. The stop can be formed with two differently sized sections to be attached to the shelf of a pallet rack, each section suitable for attachment to a differently sized pallet rack shelf, such that either can be used by merely inverting the stop. A flange can be provided at one or both ends of the stop to help align the stop with the rack and prevent the stop from pivoting about a single attachment bolt.

19 Claims, 6 Drawing Sheets

(56) References Cited

U.S. PATENT DOCUMENTS

| | | | | |
|---|---|---|---|---|
| 8,975,519 B2* | 3/2015 | Lalancette | ............. | H02G 3/126 |
| | | | | 174/57 |
| 2015/0014262 A1* | 1/2015 | McAuliffe | ............... | B65G 1/14 |
| | | | | 211/71.01 |

* cited by examiner

RACK SHELF BARRIER

TECHNICAL FIELD

The present disclosure relates generally to rack systems for storing goods, and more particularly, to a barrier, positioned at the end of a rack shelf, to help guard objects, such as pallets with goods from being pushed accidently off the shelf on which they are stored.

BACKGROUND

Storage systems are used in warehouses, department stores and other storage facilities. Conventional storage systems include a plurality of storage racks having shelves that may support large amounts of heavy materials, including shipping pallets that may be loaded with cartons of goods. Storage racks often employ a plurality of vertical columns that are positioned on a base or floor and support a plurality of horizontal shelf platforms on which the stored goods are positioned. Pallets of the goods are typically placed on the shelves with a forklift or other mechanized device.

Concerns have been raised, due to the size, weight and value of the pallets and the possibility that a pallet will be accidently pushed off the edge of a rack as, for example, a forklift is used to place a new pallet on the shelf. A fallen pallet is both dangerous and costly. Accordingly, safety systems have been employed to enhance the safety and minimize the risk of mishandling or miss loading pallets of goods onto the shelves of pallet racks.

Figure 1:
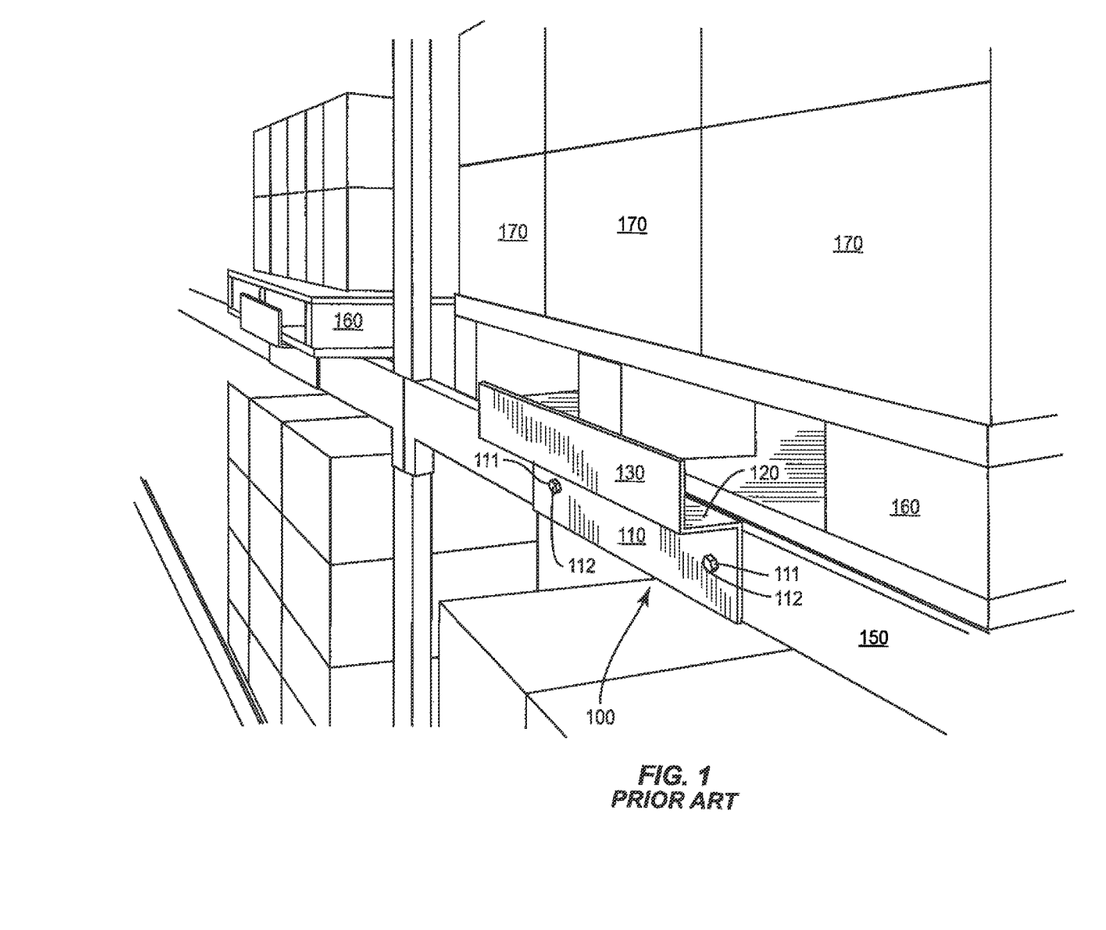
FIG. 1 is a perspective view of a conventional pallet stop, mounted on a pallet rack and supporting a pallet of goods.
Figure 2:
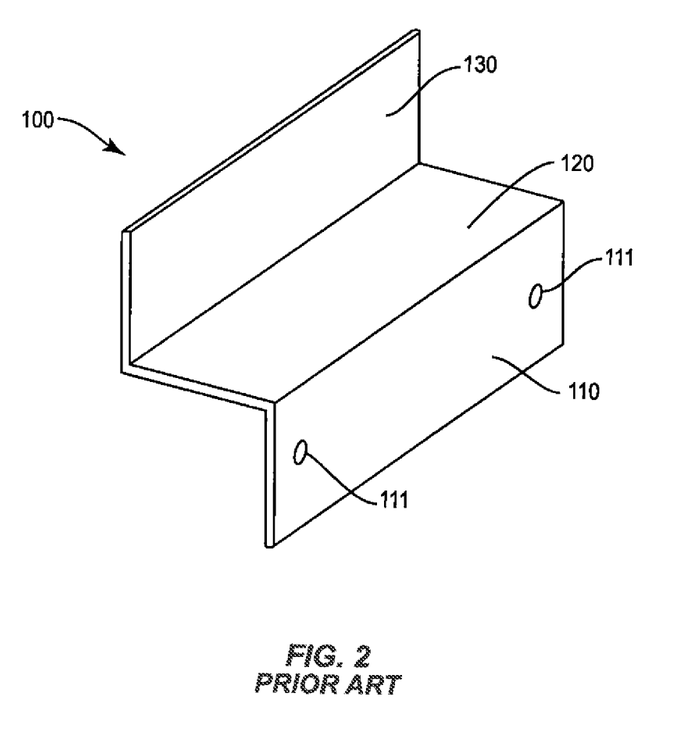
FIG. 2 is a perspective view of the conventional pallet stop of FIG. 1.

An example of a conventional pallet stop 100 is shown generally in Fig. 1. Conventional pallet stop 100 is attached to a pallet rack 150, which itself supports a plurality of pallets 160. Each pallet 160 supports a plurality of boxes of goods 170. A perspective view of conventional pallet stop 100 is also shown in FIG. 2.

Conventional pallet stop 100 includes in attachment plate section 110, integrally joined to a support ledge section 120, which itself is integrally joined to a top plate section 130. Attachment plate 110 includes a pair of through-holes 111. A pair of bolts 112 extend through holes 111, into corresponding holes (not shown) in pallet rack 150.

Conventional pallet stop 100 has not been found to be fully satisfactory. For example, in order to provide a sufficient measure of safety, conventional pallet stop 100 must be sufficiently massive, in terms of the thickness of the material and overall size, in order to prevent bending either from direct or glancing contact between pallet 160 or other objects on rack 150 and top arm 130. Conventional pallet stops are commonly at least 0.25 inches thick or made from 4 gauge or thicker steel and require two bolts to prevent it from pivoting about a single bolt. This undesirably interferes with the assembly process.

In addition, different pallet rack systems employ shelves with different thicknesses. For example, some shelves may have a height of about 4 inches, while others may have a height of about 3 inches. It can be undesirable to require warehouses to have two sets of pallet stops for the differently sized racks.

Accordingly, it is desirable to provide an improved pallet stop that overcomes deficiencies in the prior art.

SUMMARY

Generally speaking, in accordance with the invention, an improved stop member and warehouse safety system is provided to act as a barrier, guarding the edge of a shelf of a rack storing goods. In one embodiment of the invention, the improved stop includes at least one, preferably two grooves formed therein as strengthening members. The grooves can be concave grooves on one side of the stop and can also be corresponding convex ribs on the opposite side of the stop. If formed by rolling or pressing a sheet of metal, forming the concave grooves on one side of the sheet can form corresponding concave ribs on the opposite side of the sheet. In another preferred embodiment of the invention, the improved stop member is formed with two differently sized attachment surfaces, each suitable for attachment to a differently sized shelf of a different thickness, such that either size can be used by merely inverting the stop. In another embodiment of the invention, the stop member is sized for one rack, for ease of installation. As used herein, the term "stop" signifies a barrier used to help prevent items from falling off the edge of a shelf, but should not be understood to mean the it will prevent such an occurrence under all circumstances. Rather, the stop acts as a barrier to help make such falling items less likely.

In another embodiment of the invention, a flange can be provided at the attachment surface of a stop to help align the stop with the rack and to prevent the stop from pivoting about a single attachment bolt, thereby diminishing the need for two bolts. A second flange can be provided on the opposite end of the stop for use as the attachment surface with a differently sized rack. The two flanges preferably extend in different directions from and preferably at right angles to both far ends of the stop.

An improved stop in accordance with another preferred embodiment of the invention includes an attachment leg configured to be mounted on a rack; a shoulder section, extending at an angle, preferably a right angle, from a top edge of the attachment leg and a stop arm, extending upwards at an angle, preferably at a right angle from the opposite edge of the shoulder. The attachment leg and the stop arm each define a plane and the plane defined by the attachment leg is preferably substantially parallel to the plane defined by the stop arm and both are preferably perpendicular to the shoulder. One or two flanges are preferably at an angle to the attachment leg and stop arm, preferably at right angles and preferably parallel, but extending in opposite directions to each other.

In a preferred embodiment of the invention, at least one, preferably at least two strengthening features are formed in the stop member. The features should appear on at least the shoulder and the stop arm. Preferably, the features extend the entire length of the stop, extending from the far end of the attachment leg to the far end of the stop arm. The strengthening features can take the form of a concave groove on one surface of the pallet stop and a corresponding convex rib on the opposite surface of the stop.

In a preferred embodiment of the invention, the attachment leg includes a through-hole, configured to receive a bolt, rivet, pin or other member to attach the pallet stop to a shelf edge of a pallet rack. In a preferred embodiment of the invention, the attachment leg has a first height to match a first size rack shelf and the stop arm has a second different height to match a differently sized rack shelf. By inverting the pallet stop, the stop arm can assume the function of the attachment leg to attach the stop to a differently sized rack. Accordingly, it is preferred to form through-holes in both the attachment leg and the stop arm, to facilitate their interchangeable use for attachment to a shelf.

In another embodiment of the invention, the size of the stop arm and attachment are the same and only one hole is needed.

In another embodiment of the invention, a method is provided, in which strengthening ribs are formed in the stop arm of a stop member. The stop member is preferably formed from no thicker than 8 gauge steel. It can be formed 3/16 inch thick or less. The stop is then secured to the edge of a rack supporting goods with no more than one bolt through no more than one hole formed in an attachment section of the stop and helps prevents those goods from being pushed off the edge of the rack.

Other embodiments of the invention will be apparent from the drawings and the specification to follow and the scope of the invention will be indicated in the claims.

BRIEF DESCRIPTION OF THE DRAWINGS

The present disclosure will become more readily apparent from the specific description accompanied by the following drawings, in which.

Throughout the disclosure, like reference numerals will be used to indicate similar elements.

DETAILED DESCRIPTION OF PREFERRED EMBODIMENTS

The present disclosure may be understood more readily by reference to the following detailed description, taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments, by way of example only, and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. In particular, they are intended to refer to the spatial reference of the display stand in its normal, assembled configuration during intended use.

Figure 3:
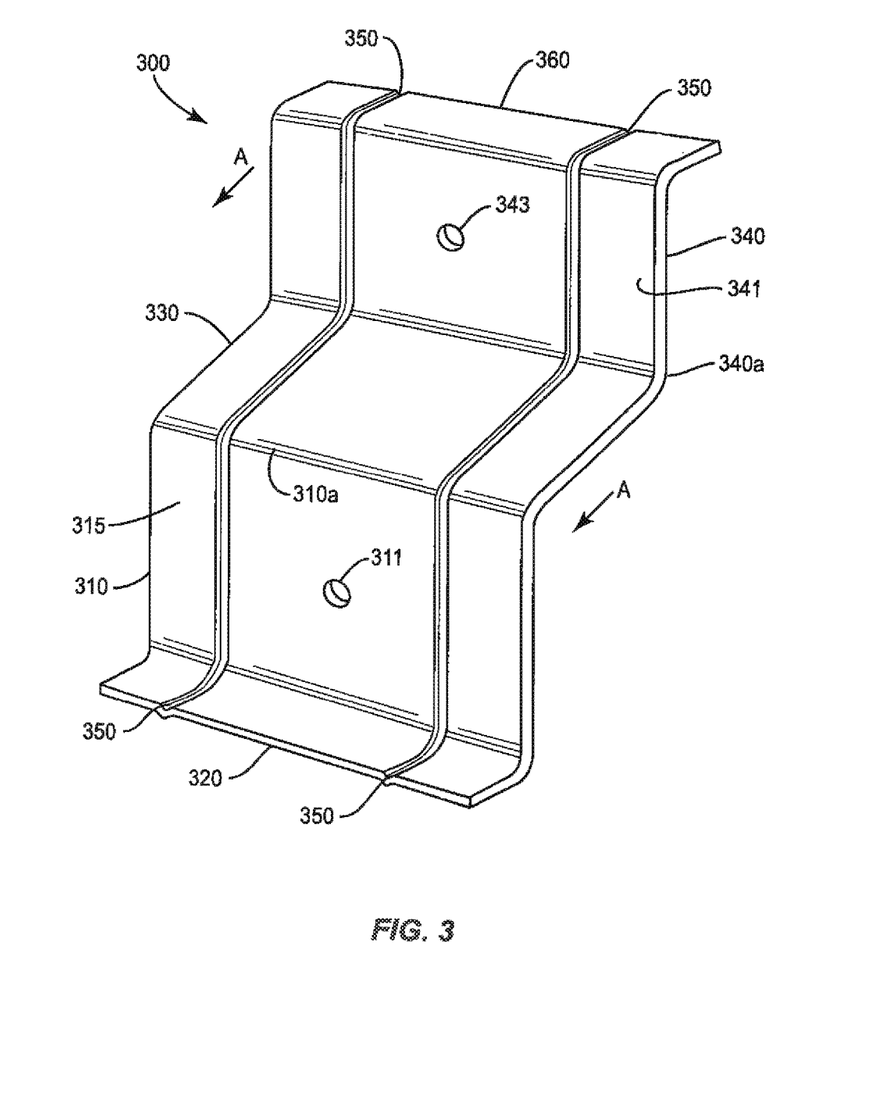
FIG. 3 is a perspective view of an enhanced pallet stop in accordance with a preferred embodiment of the invention.
Figure 4:
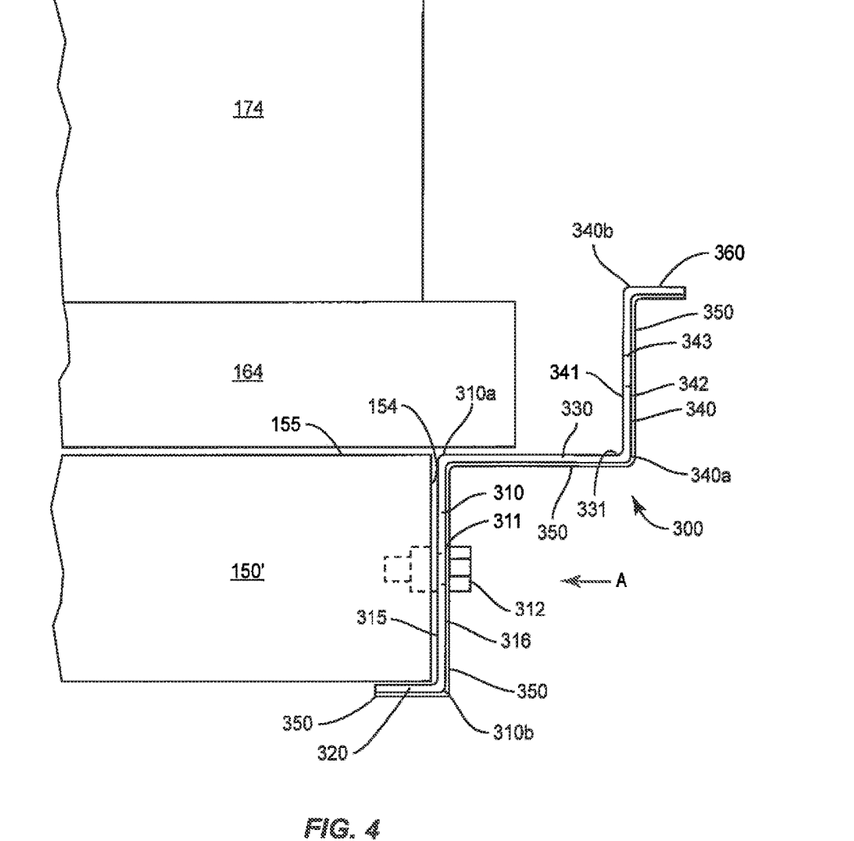
FIG. 4 is and exploded side view of the enhanced pallet stop of FIG. 3, attached to a pallet rack supporting a pallet of goods.
Figure 5:
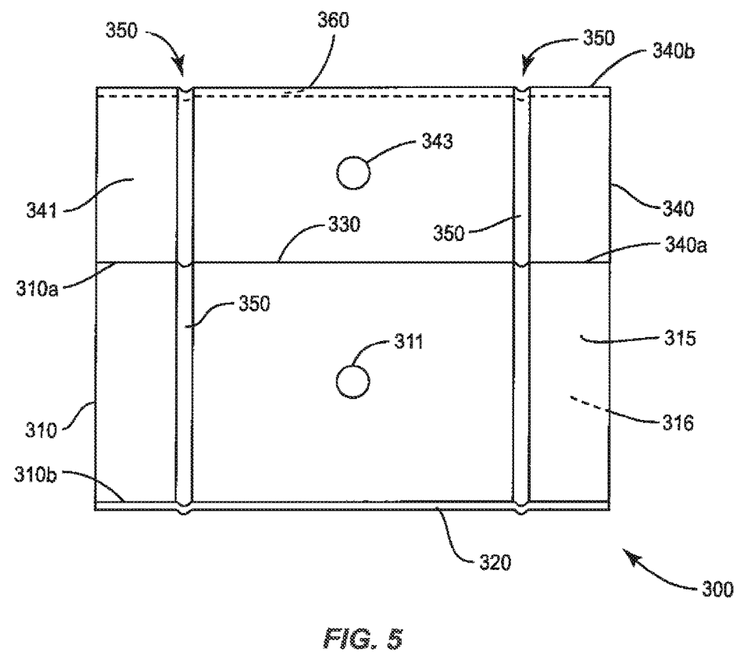
FIG. 5 is a front plan view of the enhanced pallet stop of FIG. 3.

An improved stop member, for use as a pallet stop or to help prevent other objects from falling off the edge of a shelf, in accordance with a preferred embodiment of the invention, is shown generally as an enhanced pallet stop 300 in FIGS. 3-5. Enhanced stop 300 includes an attachment leg 310 having an attachment surface 315 and an outer surface 316. Attachment surface 315 is intended to face and engage a shelf edge 154 of a shelf 155 of a pallet rack 150'. A through-hole 311 is provided through attachment leg 310 and accepts a bolt 312 to attach pallet stop 300 to shelf edge 154. Other fastening devices, such as pins, hooks, rivets, etc. are acceptable. Outer surface 316 faces the opposite direction from attachment surface 315 and an attachment direction (arrow A) is defined as the direction from outer surface 316, toward attachment surface 315. Bolt 312 is inserted in the attachment direction.

Attachment leg 310 includes an upper end 310a and a lower end 310b. Attachment leg 310 is sized to generally match the height of shelf edge 154 to which it is attached. Commonly, these heights are about 3 inches, 3.5 inches, 4 inches and otherwise. Attachment leg 310 also includes (optionally) a first flange 320. First flange 320 extends in the attachment direction from lower end 310b of attachment leg 310. First flange 320 extends along the underside of shelf edge 154. First flange 320 helps align enhanced pallet stop 300 and prevent pallet stop 300 from pivoting about through-hole 311.

A shoulder 330 extends at an angle, preferably a right angle, from top end 310a in a direction opposite the attachment direction. Shoulder 330 is intended to be substantially at the height of shelf 155 of pallet rack 150'. Shoulder 330 defines a plane that is substantially parallel to a plane defined by first flange 320. Shoulder 330 is intended to provide clearance, such that a pallet 164 can extend a small amount off the edge of shelf 155. Shoulder 330 includes a far end 331 opposite the end of shoulder 330 intersecting attachment leg 310.

A stop arm 340 extends upward and at an angle, preferably a right angle, from far end 331 of shoulder 330, in a direction parallel to, but opposite the direction attachment leg 310 extends from shoulder 330. Thus, stop arm 340 is preferably substantially parallel to attachment leg 310 and both are preferably substantially perpendicular to shoulder 330 and first flange 320. Stop arm 340 includes a lower end 340a where it is joined to shoulder 330 and an upper end 340b. Stop arm 340 also includes a stop surface 341 facing in the attachment direction and an outside surface 342 on the opposite side of stop arm 340. A through-hole 343 is provided through stop arm 340. In one embodiment of the invention, enhanced pallet stop 300 can be inverted, outside surface 342 will become an engagement surface to engage edge 154 of pallet shelf 150' and bolt 312 can be inserted through through-hole 343. In this inverted configuration, outer surface 316 will become the stop surface to engage a pallet that is being pushed too far off pallet shelf 155.

Enhanced stop 300 also includes a second flange 360. Second flange 360 extends at an angle, preferably a right angle, from upper end 340b of stop arm 340, in a direction opposite the engagement direction. Second flange 360 defines a plane that is preferably substantially parallel to the planes defined by shoulder 330 and first flange 320. Second flange 360 is preferably substantially perpendicular to the planes defined by engagement leg 310 and stop arm 340. If stop 300 is inverted, second flange 360 is positioned under pallet shelf 150' and prevents pallet stop 300 from pivoting about through hole 343.

Enhanced pallet stop 300 includes strengthening features, in the form of stiffening grooves 350. Grooves 350 extend the entire surface of pallet stop 300. Grooves 350 are concave grooves on one surface of pallet stop 300 and take the form of corresponding convex ribs on the opposite side of pallet stop 300. In another embodiment of the invention, one stiffening groove 350 is concave and one stiffening groove 350 is convex on the same surface of pallet stop 300. Strengthening features 350 can also take the form of convex ribs, with the corresponding grooves on the opposite surface. Thus, the grooves can face the pallet rack, face away from the pallet rack or include one of each.

The manufacture of enhanced pallet stop 300 can proceed as follows. A rectangular piece of sheet-metal is provided and one or two holes are formed therethrough. In one embodiment of the invention, all of the above described features are formed by pressing the piece of metal into an appropriately configured die. In another embodiment of the invention, stiffening grooves 350 can be formed by pressing or rolling and then the metal can be bent to form the flanges, engagement leg, shoulder and stop arm. In one embodiment of the invention, the stiffening grooves/ribs are formed before the piece is bent to form the flanges, attachment leg, stop arm and shoulder. In another embodiment of the invention, the stiffening grooves/ribs are formed after the ledges, engagement leg, shoulder and stop arm are formed by bending the metal piece. In still another embodiment of the invention, enhanced pallet stop 300 can be formed by casting or molding or otherwise forming the metal (or other material) in the desired shape.

In a preferred embodiment of the invention, the engagement leg can be about 2-4 inches in height, preferably about 2.75-3.25 inches. The stop arm is preferably about 3-5 inches in height, more preferably about 3.75-4.25 inches. The shoulder preferably extends about 2-4 inches from the attachment leg, preferably about 2.75-3.25 inches. The flanges preferably extend about 0.5-1.5 inches, more preferably about 0.75-1.25 inches. The through-holes are preferably about 5/16-9/16, more preferably about 6/16-8/16 inches in diameter. Enhanced pallet stop 300 is preferably about 4-8 inches, mote preferably about 5-7 inches wide. In another embodiment of the invention, the enhanced pallet stop can be wider, and can include a pair of through holes on the engagement leg and optionally, also on the stop arm. If the pallet stop includes two through holes, the ledges become less important to prevent pivoting, because the use of two, spaced apart bolts will provide this effect.

In an embodiment of the invention, engagement leg 310 has the same height as stop arm 340. In another embodiment of the invention, they have different heights and the enhanced pallet stop can be inverted, so that the engagement leg becomes the stop arm and the stop arm becomes the engagement leg. In this manner, the pallet stop can more conveniently be used with pallet rack shelves of different thicknesses.

Enhanced pallet stop 300 can be formed from a variety of materials, including wood, plastic and metal. Steel is the preferred material, preferably 3/16 inch or thinner. It can be formed from about 14 to 6 gauge steel, more preferably from about 12 to 8 gauge steel. Enhanced pallet stop 300 is preferably 0.1 inch-0.2 inches thick, preferably 0.12-0.18 inches thick. When only one through hole is included, the through-hole is preferably centered to both the height and width of pallet stop 300.

Stop arm 360 is preferably at approximately a right angle to shoulder 330 and is preferably substantially parallel to engagement leg 310. The ability of stop arm 340 to resist forces pressing on stop surface 341 and to prevent those forces from deforming stop arm 340 away from engagement leg 310, represent and important aspect of the invention.

Figure 6:
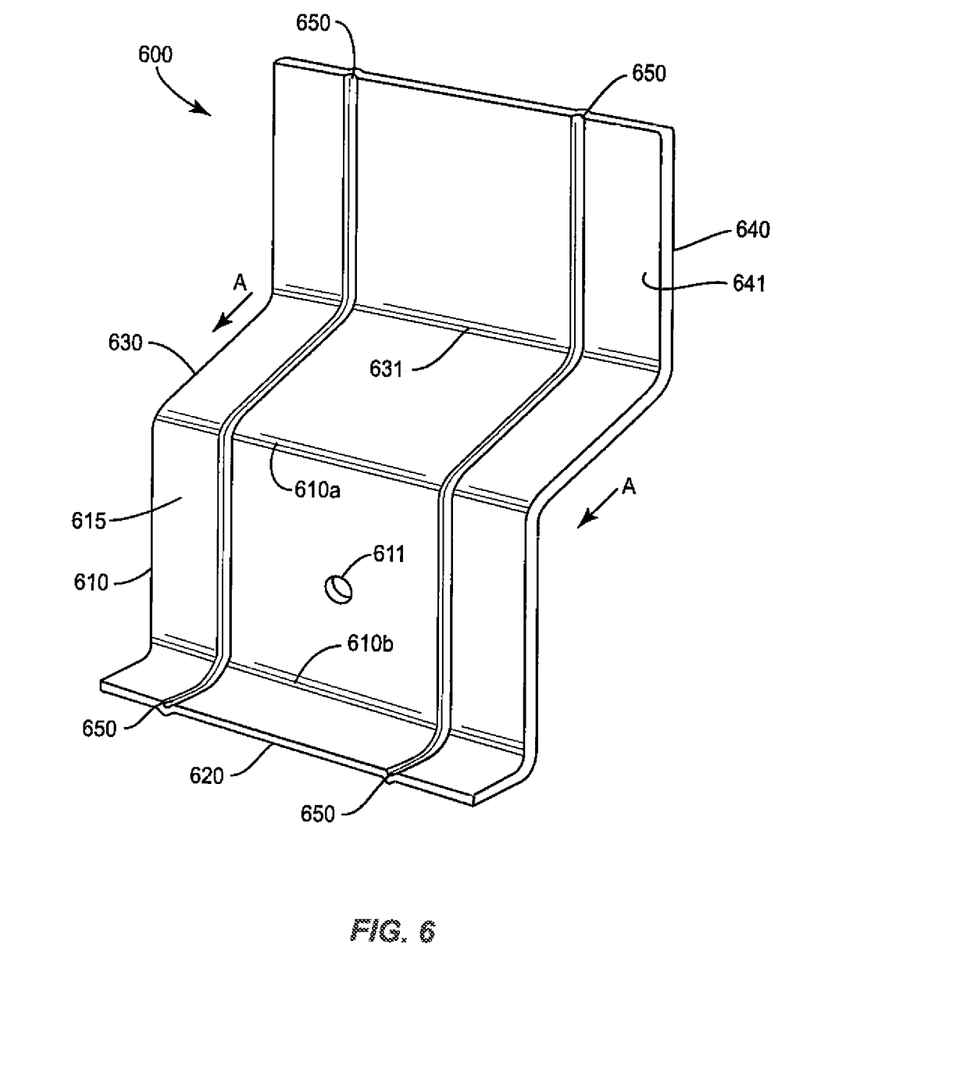
FIG. 6 is a perspective view of an enhanced pallet stop in accordance with another preferred embodiment of the invention.

A pallet stop in accordance with another preferred embodiment of the invention is shown generally in FIG. 6 as a single direction pallet stop 600. Single direction pallet stop 600 includes an attachment leg 610 having an attachment surface 615. Attachment surface 615 is intended to face and engage a shelf edge of a pallet rack in the attachment direction of an arrow A. A through hole 611 as provided through leg 610 and accepts a bolt to attach pallet stop 600 to this shelf edge. Other fastening devices, such as pins, hooks, rivets and so forth are also acceptable.

Attachment leg 610 includes an upper end 610a and a lower end 610b. Attachment leg 610 is sized to generally match the height of the shelf edge to which it is attached. Commonly, these heights or about 3 inches, 3.5 inches, 4 inches and otherwise. Thus, the height of attachment leg 610 will be these approximate heights. Attachment leg 610 also includes an optional flange 620. Flange 620 extends in the attachment direction of arrow A, from lower end 610b of attachment leg 610. Flange 620 extends along the underside of the shelf edge and helps align pallet stop 600 with the shelf edge and help prevents it from pivoting about hole 611.

A shoulder 630 extends at an angle, preferably a right angle, from top end 610a, in a direction opposite the attachment direction. Shoulder 630 is intended to be substantially at the height of e.g., shelf 155 of pallet rack 150'. Shoulder 630 defines a plane that is substantially parallel to a plane defined by flange 620. Shoulder 630 is intended to provide clearance, such that a pallet 164 can extend a small amount off the edge of shelf 155. Shoulder 630 includes a far end 631 opposite the end of shoulder 630 intersecting attachment leg 610.

A stop arm 640 extends upward at an angle, preferably a right ankle, from far end 631 of shoulder 630, in a direction parallel to, but opposite the direction attachment leg 610 extends from shoulder 630. Thus, stop arm 640 is preferably substantially parallel to attachment leg 610 and both are preferably substantially perpendicular to shoulder 630 and flange 620. Stop arm 640 includes a stop surface 641, facing in the attachment direction.

Single direction pallet stop 600 includes strengthening features, in the form of stiffening grooves 650, similar to grooves 350. Grooves 650 can extend the entire surface of pallet stop 600, but in preferred embodiments of the invention, only extend along a part of pallet stop 600, such as from shoulder 630 to stop arm 640. Grooves 650 are concave grooves on one surface of pallet stop 600 and can take the form of corresponding ribs on the opposite side of pallet stop 600. In another embodiment of the invention, only one stiffening grooves is provided and optionally, three or more stiffening grooves can be provided. The strengthening feature can take the form of convex ribs, with corresponding grooves on the opposite surface. Thus, the grooves can face pallet rack or face away from the pallet rock, or include one of each.

Please note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A stop member adapted to be mounted on the edge of a shelf supporting pallets loaded with goods, to help prevent the pallets of goods from being accidentally pushed off the edge of the shelf, the stop, comprising:
an attachment section having a first end and a second end opposite the first end;
a shoulder section extending from the second end of the attachment section at an angle with respect to the attachment section, the shoulder section having a near end at the intersection with the attachment section and a far end opposite the near end;
a first flange extending from the first end of the attachment section, at a right angle to the attachment section and in an opposite direction as the shoulder section;
a stop section extending from the far end of the shoulder section, at an angle to the shoulder section, the attachment section and the stop section extending in opposite directions from the shoulder section;
the attachment section, the shoulder section and the stop section formed of an integral piece of material having at least one strengthening feature that increases the resistance of the stop member to bending, extending from the stop section to the shoulder section, the strengthening feature being a concave groove on one surface of the stop member and a convex rib on the opposite surface of the stop member.

2. The stop member of claim 1, wherein the attachment section, the shoulder section and the stop section are formed of a substantially uniformly 8 gauge to 12 gauge sheet of steel having at least one hole through the attachment section, sized to receive a bolt to secure the attachment section to a shelf for supporting goods.

3. The stop member of claim 2, wherein the shoulder section extends from the second end of the attachment section at substantially a right angle to the attachment section, and the stop section and the attachment section each define a plane and the plane of the stop section is substantially parallel to the plane of the attachment section.

4. The stop member of claim 3, wherein the stop section extends from the far end of the shoulder at substantially a right angle to the shoulder.

5. The stop member of claim 1, wherein the strengthening feature extends substantially the length of the stop member from the attachment section to the stop section.

6. The stop member of claim 5, comprising a second strengthening feature having a continuous concave groove on one surface of the stop member and a corresponding convex rib on the opposite surface of the stop member extending substantially the length of the stop member.

7. The stop member of claim 2, comprising at least two strengthening features, each extending continuously and substantially the length of the stop member from the attachment section to the stop section.

8. The stop member of claim 3, wherein the first flange extends a shorter distance than the length of the attachment section from the first end to the second end.

9. The stop member of claim 1, comprising a second flange, extending at an angle from an edge of the stop section opposite the intersection of the stop section with the shoulder section, the second flange extending from the stop section in a direction opposite the attachment direction.

10. The stop member of claim 9, wherein the height of the attachment section from the first flange to the shoulder section is shorter than the height of the stop section, from the shoulder section to the second flange and a hole is present through both the attachment section and the stop section, sized to receive a bolt to secure the attachment section or the stop section to a shelf for supporting goods.

11. A stop member, adapted to be mounted on the edge of a shelf, to help prevent items from being accidentally pushed off the edge of the shelf, the stop member comprising:
an attachment leg extending in a first direction from a first end to a second end opposite the first end;
a shoulder extending in a second direction at substantially a right angle from the second end of the attachment leg, the shoulder having a near end at the intersection with the attachment leg and a far end opposite the near end;
a stop arm extending from the far end of the shoulder, in the first direction, at a right angle to the shoulder;
a first flange extending opposite to the second direction, at a right angle from the first end of the attachment leg and
at least one strengthening rib longitudinally in the first direction and the second direction from at least the shoulder to the stop arm.

12. The stop member of claim 11, wherein the attachment leg, the shoulder and the stop arm are formed of an integral piece of metal 10 gauge to 12 gauge, having at least a first concave groove on one surface and a convex rib on the opposite surface, extending longitudinally from the attachment leg to the stop arm.

13. The stop member of claim 12, comprising a second groove parallel to the first groove.

14. The stop member of claim 12, wherein the first flange extends a distance from the first end of the attachment leg less than the distance from the first end of the attachment leg to the second end of the attachment leg.

15. The stop member of claim 14, comprising a second flange extending in the second direction from the end of the stop arm, opposite the end of the stop arm attached to the shoulder.

16. A stop member, adapted to be mounted on the edge of a shelf, to help prevent items from being accidentally pushed off the edge of the shelf, the stop member, comprising:
an engagement leg attached to a stop arm, formed of an integral piece of metal, the engagement leg and stop arm about 2 to 5 inches in height and 0.1 to 0.2 inches thick, with at least one stiffening rib extending continuously in a longitudinal direction on the engagement leg and stop arm, along the length of the stop member, wherein there is one hole only through the engagement leg, the one hole at the approximate widthwise centerline, with a diameter of from about 5/16-9/16 inches wide and a first flange extending from the engagement leg and adapted to engage the shelf and prevent the stop member from rotating with respect to the shelf.

17. The stop member of claim 16, wherein the engagement leg and stop arm are about 4 to 8 inches wide.

18. The stop member of claim 16, wherein the engagement leg and stop arm are formed from steel having a thickness gauge from about 10 to about 14.

19. The stop member of claim 18, wherein the engagement leg is about 2 to 3 inches in height and the stop arm is about 1 inch taller than the engagement leg.

\* \* \* \* \*